United States Patent [19]

Ruttenberg

[11] Patent Number: 5,531,381
[45] Date of Patent: Jul. 2, 1996

[54] PULSATING DRIP LATERALS

[76] Inventor: Gideon Ruttenberg, 81-465 Date Palm Ave., Indio, Calif. 92201

[21] Appl. No.: 318,564

[22] Filed: Oct. 5, 1994

[51] Int. Cl.$^6$ ............................ B05B 1/08; B05B 1/20
[52] U.S. Cl. ...................... 239/99; 239/101; 239/266; 239/533.15; 239/557; 239/562; 239/571; 137/624.14; 137/853
[58] Field of Search .................. 239/266–268, 239/533.1, 533.15, 542, 547, 548, 556, 557, 562, 563, 566, 567, 571, 99, 101; 137/624.14, 853

[56] References Cited

U.S. PATENT DOCUMENTS

| | | | |
|---|---|---|---|
| 3,902,664 | 9/1975 | Deines | 239/99 |
| 4,176,791 | 12/1979 | Cattaneo et al. | 239/99 X |
| 4,512,514 | 4/1985 | Elcott | 239/533.1 X |
| 5,249,745 | 10/1993 | Bertolotti | 239/101 X |
| 5,267,690 | 12/1993 | Gazzoni | 239/101 X |

*Primary Examiner*—Andres Kashnikow
*Assistant Examiner*—Lesley D. Morris

[57] ABSTRACT

This invention relates to pulsating drip laterals for use in irrigation and other applications. The combination of pulsators and drip laterals is used for decreasing the flow of the drippers and for decreasing their chance of getting plugged. More specifically, this invention relates to pulsating drip laterals in which the pulsators are made so that pressurized fluid can flow through them while, at the same time, a low continuous flow of some of the fluid flows out from each pulsator at high intermittent pulsating flow to a group of drippers. It farther relates to pulsators that are connected in line of different types of drip conduit and to drip laterals in which pulsators are inserted in the drip conduits during the extrusion process of the conduits.

9 Claims, 3 Drawing Sheets

PULSATING DRIP LATERALS

BACKGROUND

My U.S. patent Ser. No. 4,955,539, my U.S. patent application Ser. No. 988,946, now abandoned U.S. Pat. No. 4,781,217 to Rosenberg and U.S. patent Ser. No. 5,314,116 to Krauth and Brunnengraber describe method and apparatus for converting low continuous pressurized fluid flow to high intermittent pulsating pressurized flow.

The high pulsating flow ejected from the pulsator is used for operating a sprinkler, a shower head or a group of drippers connected to the outlet from such pulsators.

In pulsating devices as described, a flow control, a dripper, a nozzle or other flow control means are used at the inlet to each such pulsating device for controlling the flow of fluid into each such pulsator at a relatively low controlled rate compared with the high pulsating flow rate ejected through the outlet from each pulsator.

A fluid distribution drip lateral can be connected to the outlet from such a pulsating device for creating a pulsating distribution drip lateral. However, in such pulsating drip lateral a relatively high pressure drop is created along the lateral in response to the high pulsating flow ejected into the lateral during each pulse.

In addition, elevation differences along the lateral may cause some of the fluid to drain from the lateral between each two pulses. As a result, the practical application of such pulsating drip lateral is limited to only relatively short length lateral in which a short drip lateral is connected to the outlet from a single pulsator.

SUMMARY OF THE INVENTION

This invention relates to pulsating drip laterals in which two or more pulsating devices are connected in line of a drip lateral.

Such a pulsating drip lateral comprises:
1. Fluid supply conduit and fluid distribution conduit which are connected in parallel to each other forming one continuous lateral with two or more pulsating devices in line of the lateral.
2. Pulsating devices in which each pulsator is having:
   (a) A major fluid inlet.
   (b) A major fluid outlet.
   (c) A bore
   (d) A receptacle.
   (e) An inlet to the receptacle
   (f) An outlet from the receptacle
   (g) A secondary outlet from the pulsator.
3. Pressurized fluid inlet at one end of the pulsating drip lateral and means for plugging the other end of the lateral.

In such pulsating drip laterals:
   (a) Pressurized fluid that enters the inlet of the pulsating drip lateral at one end continues to flow in the fluid supply conduit to the first pulsator in the lateral. The fluid enters the first pulsator through its major inlet, continues to flow through the bore and out from the first pulsator through its major outlet and then continues to flow through the fluid supply conduit to next pulsator and to all other pulsators downstream from the first pulsator. The bore of each pulsator becomes an integral part of the fluid supply conduit.
   (b) As the fluid flows through the fluid supply conduit some of the fluid flows at a relatively low continuous flow into the receptacle of each pulsator. The low continuous fluid flow entering the receptacle through its inlet is ejected from its outlet at high intermittent pulsating flow into the secondary outlet from the pulsator, and out from the pulsating drip lateral.
   (c) The secondary outlet from each pulsator is in fluid communication with the fluid distribution conduit.
   (d) A flow control or other means can be used for controlling the low continuous fluid flow Q1 entering the receptacle of each pulsator.
   (e) The relatively low continuous flow Q1 entering the receptacle of each pulsator in the pulsating drip lateral is ejected at high pulsating intermittent flow Q2 to a group of N outlets from the fluid distribution fluid. As a result, during a short time t which may last for only a small fraction of the pulsator cycle time T, the fluid flows through the N outlets at a total instant flow Q2 and the average instant flow through each outlet is Q2/N. Yet since the fluid that enters the receptacle is controlled at a low continuous flow Q1, the actual average flow through each outlet is only Q1/N.

When for example Q1 is controlled at the inlet to the receptacle by means of an 8 liter/hour flow control and the fluid distribution conduit has a group of 40 drippers with a nominal flow of 4 liter/hour each:

The instant average pulsating flow through each dripper can be 4 liter/hour yet the actual average flow through each dripper is only 8/40=0.2 liter/hour.

By using such combination of drippers and pulsator, drippers having high nominal flow (4 liter/hour in this example) which are made with a large path and are less sensitive to plugging, can be operated at a very low flow (0.2 liter/hour in this example).

(f) The fluid supply conduit and the fluid distribution conduit are connected in parallel to each other forming one continuous lateral with a group of pulsators connected in line to the lateral. Such combination is forming one long pulsating drip lateral which can be easily handled. It can be easily installed and easily retrieved.
   (g) The fluid supply conduit and the fluid distribution conduit can be made in different alternatives as follows:
      A section of the fluid supply conduit can be inserted into a section of a fluid distribution fluid conduit which its inside diameter is larger than the outside diameter of the fluid supply conduit. Each such section of the two conduits is connected at both of its ends between two pulsators along the pulsating drip lateral.
      The two conduits can be located side by side
      The two conduits can be formed in one extruded profile.
      The pulsators can be inserted in an extruded profile formed with two conduits during the extrusion process of the profile.

The two conduits can be made of a plastic material such as polyethylene, or from elastomer material such as EPDM rubber or thermoplastic elastomer such as Kraton.

The multiple outlets from the fluid distribution conduit can be perforations made in the wall of the conduit or it can be drippers or the like, connected to the conduit.

Pulsating drip laterals as described are useful for irrigation and for many other applications and as for example they can be used for injecting one fluid that enters the pulsating drip lateral into a second fluid which surrounds the pulsating drip lateral.

DETAILED DESCRIPTION OF THE DRAWINGS

Figure 1:
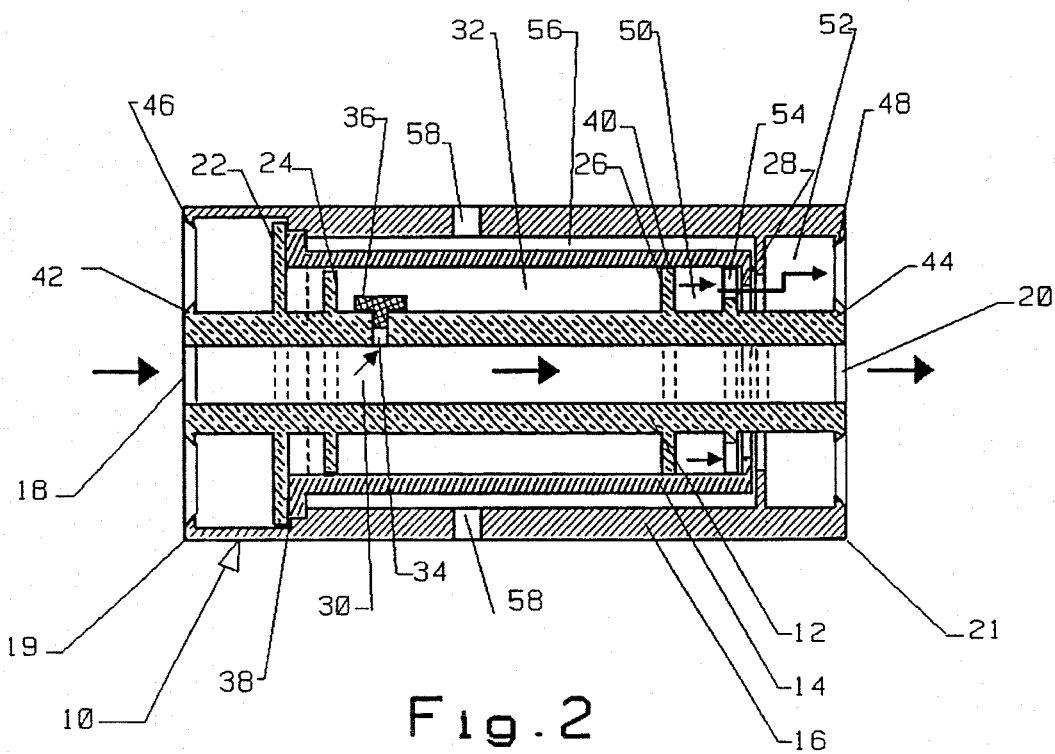
FIG. 1 shows a typical pulsator which can be connected in line of pressurized fluid conduit which is surrounded by a fluid distribution drip conduit.

FIG. 1 Shows in a cross section an in line pulsator.

Pulsator 10 is comprised of insert 12, elastic sleeve 14, and casing 16. Insert 12 is formed with fluid major inlet 18 formed at pulsator inlet section 19 and fluid major outlet 20 formed at fluid outlet section 21. Flanges 22, 24, 26, and 28 are formed on the circumference of insert 12. Bore 30 in the center of insert 12 allows a fluid to flow through pulsator 10 from its major inlet 18 through bore 30 to its major outlet 20.

A receptacle chamber 32 is created at the center of pulsator 10 between insert 12 and the inside surface of elastic sleeve 14 and enclosed between flange 24 and flange 26.

Hole 34 in insert 12 is serving as the inlet to receptacle chamber 32. Inlet 34 is in fluid communication with bore 30. Hole 34 itself, flow control means or a dripper 36 connected to hole 34 can be used for controlling a low continuous fluid flow into the receptacle chamber 32. Casing 16 can be cemented or welded to insert 12 along their contact surface 38 or connected by other means, pressing elastic holding sleeve 14 at a fixed location. Elastic sleeve 14 is pressed against flange 22 and against the circumference of flanges 24 and flange 28. Elastic sleeve 14 is also in contact with surface 40 at the circumference of flange 26, creating a preset pressure response normally closed outlet from chamber 32.

Barb 42 formed on major inlet 18 and barb 44 formed on major outlet 20 of pulsator 10 are made for connecting a small size conduit to both sides of pulsator 10. Barb 46 formed on casing 16 at the inlet section 19 and barb 48 formed on casing 16 at the outlet section 21 are made for connecting a larger size conduit from both ends of pulsator 10. A transition space 50 is created between flange 26 and flange 28 and another space 52 is created between casing 16 and insert 12. Space 50 and space 52 are in free fluid communication through radial slots 54 on flange 28. Space 56 created around elastic sleeve 14 and enclosed in casing 16 allows expansion of elastic sleeve 14. Holes 58 in casing 16 are venting space 56.

OPERATION—FIG. 1

Pulsator 10 is made so that when pressurized fluid flows to its major inlet 18 and through bore 30, some of the fluid flows at a relatively low controlled rate Q1 through hole 34 and through flow control means 36 located at hole 34 into chamber 32. The pressurized fluid enters receptacle chamber 32. A contact between the inner surface of elastic sleeve 14 and surface 40 at the circumference of flange 26 creates a preset pressure response normally-closed outlet from chamber 32, preventing the fluid from flowing out from chamber 32 into transition chamber 50.

As fluid continues to flow into chamber 32, elastic sleeve 14 expands, and the volume of the fluid and its pressure in chamber 32 increases.

At a certain pressure P1, within chamber 32, a slight additional expansion of elastic sleeve 14 creates a path with a very small cross section around surface 40 of flange 26, which allows the fluid to flow out from chamber 32 at a low flow rate Q1. This low flow through the small path creates a pressure drop dP which is forcing the pressure inside chamber 32 to increase by dP from P1 to P2. In response to the pressure P2, additional expansion of the elastic sleeve 14 creates a wide open cross section path surrounding surface 40. The fluid then flows at a high flow rate Q2 out from chamber 32 to chamber 50 and then through slots 54 to space 52 which is also the secondary outlet from pulsator 10. At the same time, the fluid continues to flow into chamber 32 at a low controlled flow rate Q1. As a result, the volume of the fluid in chamber 32 decreases, the pressure inside chamber 32 drops, the elastic sleeve 14 contracts and closes the outlet from chamber 32, terminating one pulsating cycle.

Figure 2:
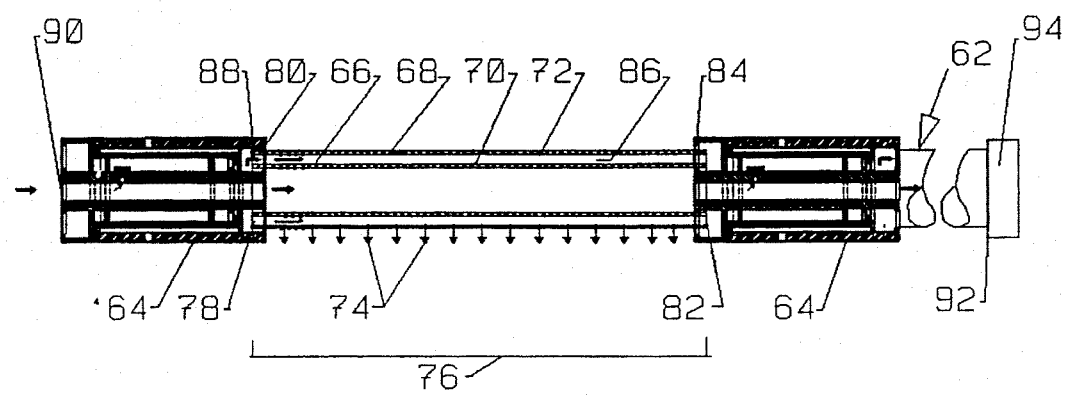
FIG. 2 shows one type of pulsating drip lateral according to this invention in which a group of pulsators described in FIG. 1 are connected in line with sections of fluid supply conduits which are surrounded by sections of fluid distribution drip conduits.

FIG. 2 shows in a cross section one type of pulsating drip lateral.

Pulsating drip lateral 62 is comprised of pulsators 64, fluid supply conduit 66 and fluid distribution conduit 68.

Conduit 66 has an outside diameter 70 smaller than the inside diameter 72 of conduit 68. Conduit 68 can be perforated or it may have drippers 74. Sections 76 of pulsating drip lateral 62 comprises sections of conduit 66 inserted in sections of conduit 68. The two conduits are connected at one end 78 to the outlet section 80 of pulsator 64 and the other end 82 of section 76 is connected to the inlet section 84 of another pulsator 64.

A space 86 is created at each section 76 between the inside surface of conduit 68 and outside surface of conduit 66. Space 86 is plugged at one of its ends 82 and at its other end 78 space 86 is in free fluid communication with space 88.

Pulsating drip lateral 62 is connected at its inlet section 90 to a source of pressurized fluid and its other end 92 is plugged by fitting 94.

OPERATION—FIG. 2

Pressurized fluid enters pulsating drip lateral 62 at its inlet 90 and continues to flow through pulsators 64 and conduit 66, delivering the fluid from the inlet 90 of pulsating drip lateral 62 to its plugged end 92. A low controlled fluid flow Q1 at each pulsator 64 is converted to high pulsating flow Q2 ejected into space 88, which is also the secondary outlet from each pulsator 64, to space 86 of each section 76. From space 86 the fluid flows at a high instant pulsating flow Q2 to a group of N drippers 74 located at each section 76 and out from pulsating drip lateral 62 through the multiple outlets or drippers 74.

During the ejection time t of each pulse, which may last for only a small fraction of the pulsating cycle time T, a high instant flow Q2 enters each space 86 and during this short time t the average flow through each dripper is Q2/N.

Since the fluid flows into each space 86 of each section 76 at a low controlled flow Q1, the average flow through each dripper is only Q1/N.

When for example each section 76 includes 40 drippers with a nominal flow of 4 liter/hour/dripper and the flow out from each pulsator 64 is controlled by a flow control of only 8 liter/hour, the average flow through each dripper will be only (8/40=) 0.2 liter/hour. The result is that drippers with high nominal flow of 4 liter/hour, which have lower sensitivity to plugging can be operated at a very low flow of only 0.20 liter/hour, a flow which in this example is 20 times lower than the nominal flow of the drippers.

Figure 3A:
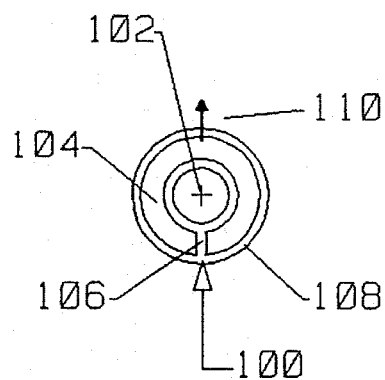
FIG. 3a and FIG. 3b shows an extruded profile which can be used for replacing the two conduits described in FIG. 2.

FIG. 3a shows in a side view an extruded profile with two separate conduits which can replace the two conduits described in FIG. 2.

Profile 100 is extruded with conduit 102 and conduit 104 which are connected to each other by rib 106. Wall 108 of profile 100 can be perforated or it may have drippers 110.

Figure 3B:
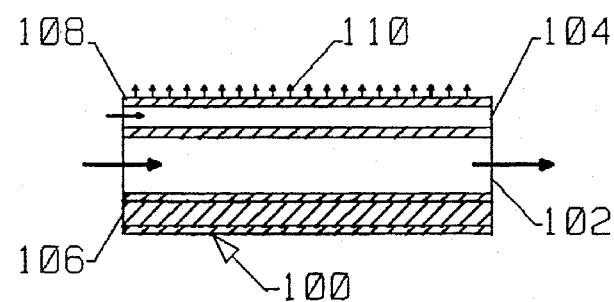

FIG. 3b Shows a longitude cross section of the extruded profile of FIG. 3a.

OPERATION—FIG. 3a and FIG. 3b.

Sections of profile 100 can be connected in line of pulsators as illustrated in FIG. 2 with the major inlet and the major outlet of each pulsator connected from both sides of each pulsator to the fluid supply conduit 102. At each pulsator fluid flows from its secondary outlet and enters conduit 104 at high instant flow and than ejects out from conduit 104 out from the pulsating drip lateral through multiple outlets 110.

Figure 4:
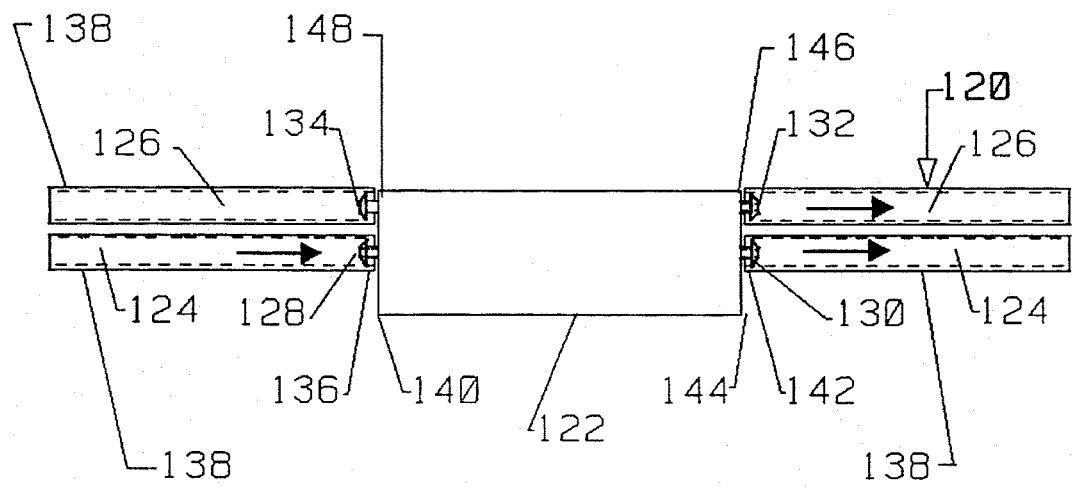
FIG. 4 shows a pulsating drip lateral in which two conduits are connected in parallel to the inlet and to the outlet of a pulsator.

FIG. 4 shows in a top view a pulsating drip lateral in which sections of two conduits are connected in parallel to the pulsators.

Pulsating drip lateral 120 is comprised of pulsators 122, fluid delivering conduit 124 and fluid distribution conduit 126.

Pulsator 122 is made with tube connectors 128, 130, 132 and 134. Connector 134 is a plug.

One end 136 of each section 138 of conduit 124 is connected to connector 128 at the fluid inlet section 140 of pulsator 122 and the other end 142 of each section 138 of conduit 124 is connected to connector 130 at the outlet section 144 of pulsator 122.

One end 146 of each section 138 of fluid distribution conduit 126 is connected to connector 132 at the outlet section 144 from pulsator 122 and the other end 148 of conduit 126 is connected at each section 138 to plug 134 at the inlet section 140 of each pulsator 122.

OPERATION—FIG. 4

Pulsating drip lateral 120 is operating in a similar way to that of pulsating drip lateral 62 described before in FIG. 2.

Figure 5:
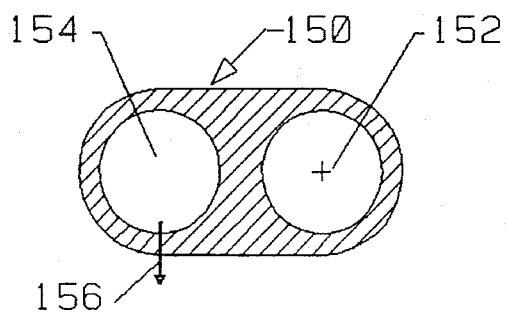
FIG. 5 Shows a double conduit extruded profile which can replace the two conduits in FIG. 4.

FIG. 5 shows in a cross section one extruded profile which can replace the two conduits described in FIG. 4.

Extruded profile 150 is formed with conduit 152 and conduit 154. Conduit 154 can be perforated or it may have drippers 156.

At each section of a pulsating drip lateral, conduit 152 can be connected to the tube connectors from both sides of the pulsator illustrated in FIG. 4 and forming a continuous fluid supply conduit. Fluid distribution conduit 154 can be connected at one of its ends, at each section of the pulsating drip lateral, to a tube connector at the outlet from the pulsator and its other end to the plug at the inlet section of each pulsator.

Operation—FIG. 5

Similar to the operation of pulsating drip lateral 120 illustrated in FIG. 4.

Figure 6:
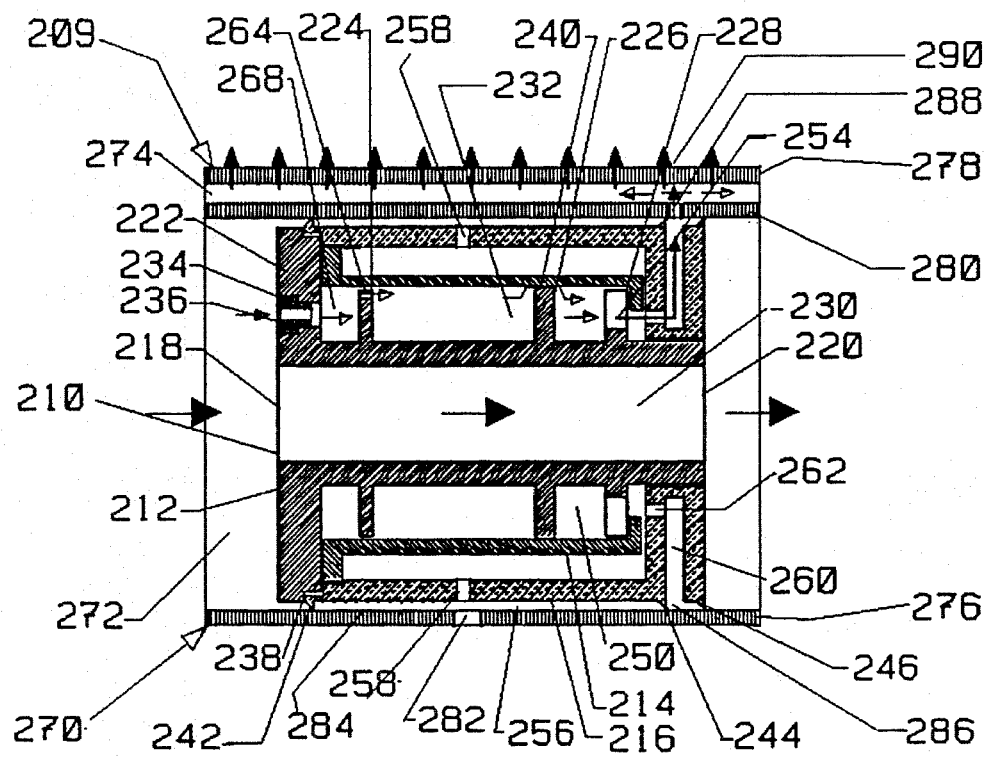
FIG. 6 Shows a pulsator inserted into a double conduit profile during the extrusion process of the profile.

FIG. 6 shows in a cross section a pulsator inserted in a double conduit profile during the extrusion process of the profile.

Pulsating drip lateral 209 is comprised of pulsators 210 and double conduits extruded profile 270.

Pulsator 210 is comprised of insert 212, elastic sleeve 214, and casing 216. Insert 212 is formed with major fluid inlet 218 and fluid major outlet 220. Flanges 222, 224, 226, and 228 are formed on the circumference of insert 212. Bore 230 in the center of insert 212 allows a fluid to flow through pulsator 210 from its major inlet 218 to its major outlet 220.

A receptacle chamber 232 is created at the center of pulsator 210 between insert 212 and the inside surface of elastic sleeve 214 and enclosed between flange 224 and flange 226.

Hole 234 in flange 222 of insert 212 is made to allow a continuous low fluid flow to enter into space 268 and then through slot 264 in flange 224 into receptacle chamber 232. This low continuous flow can be controlled by the size of hole 234 itself or by means of a flow control or a dripper 236 located in hole 234. Casing 216 can be cemented or welded to insert 212 along their contact surface 238, or the insert 212 and the casing 216 can be connected to each other by other means, pressing elastic holding sleeve 214 at a fixed location. Elastic sleeve 214 is pressed against flange 222 and against the circumference of flanges 224 and flange 228. Elastic sleeve 214 is also in contact with surface 240 at the circumference of flange 226, creating a preset pressure response normally closed outlet from chamber 232.

Barbs 242, 244 and 246 are formed on the circumference of casing 216. A transition space 250 is created between flange 226 and flange 228 and another space 260 is formed in casing 216. Space 250 and space 260 are in free fluid communication through radial slots 254 in flange 228 and hole 262 in casing 216. Space 256 created around elastic sleeve 214 and enclosed in casing 216 allows expansion of elastic sleeve 214. Holes 258 in casing 216 are venting space 256. Extruded profile 270 is extruded with conduit 272 and conduit 274. Profile 270 is made with wall 276, wall 278, and common wall 280. A space 284 is created between the inside surface of wall 276 and the outside surface of casing 216 which is confined between barbs 242 and barbs 222. Hole 282 in the wall 276 is made in profile 270 for venting space 284. Space 260 is enclosed in conduit 272 and confined between barb 244 and barb 246. Hole 288 in common wall 280 of profile 270 creates free fluid communication between space 260, which is also the secondary outlet from pulsator 210, and conduit 274. Perforations or drippers 290 in wall 278 are used for discharging the fluid out from conduit 274 and out from pulsating drip lateral 209.

Figure 7:
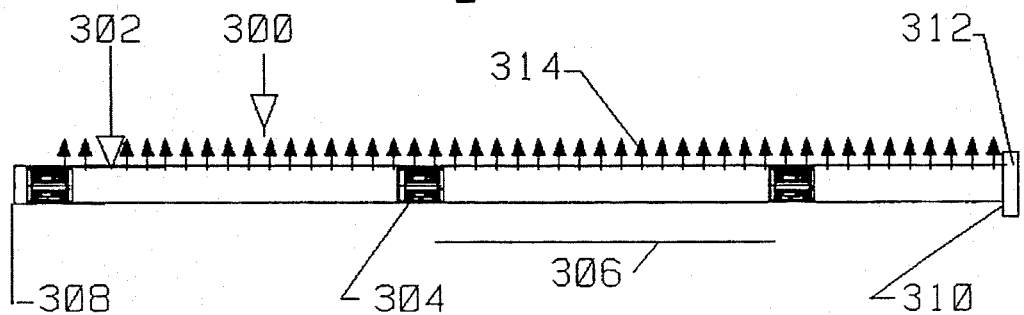
FIG. 7 shows the pulsating drip lateral of FIG. 6.

FIG. 7 shows in a top view pulsating drip lateral with build in pulsators, as shown in FIG. 6.

Pulsating drip lateral 300 comprises extruded double conduit profile 302 and pulsators 304 inserted at intervals 306 inside profile 302. At one of its ends 308 pulsating drip lateral 300 is connected to a pressurized source of fluid and its the other end 310 of pulsating drip lateral 300 is plugged by means of plug 312.

Figure 8:
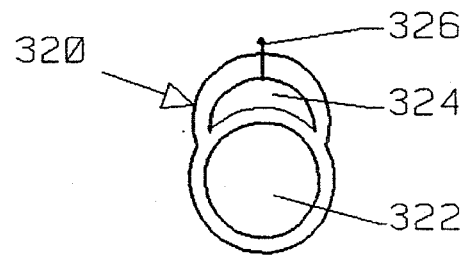
FIG. 8 Shows the extruded double conduit described in FIG. 6 and FIG. 7.

FIG. 8 shows in a side view one type of double conduit extruded profile which can be used for producing the pulsating drip lateral illustrated in FIG. 6 and FIG. 7.

Extruded profile 320 is formed with conduit 322 and conduit 324. Conduit 322 is serving as the main fluid delivering conduit and conduit 324 is serving as a distributing conduit which may be perforated or it may have drippers 326.

In the pulsators described in FIG. 1 and in FIG. 6 the space created between the outside surface of the elastic tube and the inside surface of the casing can be vented in order to allow free expansion of the elastic sleeve. Yet when the space is large enough, venting of the space is not required and in such a case the expansion of the elastic tube will cause a slight compression of the air enclosed in the space. This will effect only slightly the operation of the pulsators.

I claim:

1. A pulsating drip lateral having a fluid inlet at one end and an other end is plugged and wherein fluid that flows into said drip lateral is ejected through multiple outlets along said drip lateral at high intermittent pulsating flows, said drip lateral comprising:
   a. two or more pulsators where each pulsator is having:
      (1) an inlet and an outlet wherein said fluid can flow through it,
      (2) a receptacle,
      (3) an inlet to said receptacle,
      (4) an outlet from said receptacle,
      (5) means for controlling a continuous relatively low fluid flow into said receptacle,
      (6) tube connecting means at the inlet to the pulsator and tube connecting means at the outlet from the pulsator,
   b. main fluid supply conduit,
   c. distribution conduit having said multiple outlets,
   d. means for connecting the fluid inlet of said drip lateral to a pressurized source of fluid,
   e. means for plugging the other end of said drip lateral, wherein said pulsators are connected in line with said main fluid supply conduit so that said fluid that enters said drip lateral can flow through said main fluid supply conduit and through said pulsators to said other end of said drip lateral, said inlet to said receptacle is in fluid communication with said main fluid supply conduit, said outlet from said receptacle of each said pulsator is in free fluid communication with said distribution conduit, said main fluid supply conduit and said distribution conduit are connected in parallel to each other forming one continuous lateral, and said pulsators are connected in line to said continuous lateral thereby forming a continuous pulsating drip lateral.

2. A pulsating drip lateral according to claim 1 wherein said main fluid supply conduit is located inside said fluid distribution conduit.

3. A pulsating drip lateral according to claim 1 wherein said main fluid supply conduit and said distribution conduit are located side by side.

4. A pulsating drip lateral according to claim 1 wherein said main fluid supply conduit and said distribution conduit are formed in one extruded profile.

5. A pulsating drip lateral according to claim 1 wherein said pulsators are inserted into said main fluid supply conduit during an extrusion process of producing said conduit.

6. A pulsating drip lateral according to claim 1 wherein said multiple outlets are perforations made in a wall of said fluid distribution conduit.

7. A pulsating drip lateral according to claim 1 wherein said multiple outlets are drippers connected to said fluid distribution conduit.

8. A pulsating drip lateral according to claim 1 wherein said fluid distribution conduit is made of elastomeric material with perforations in a wall.

9. A pulsating drip lateral according to claim 1 wherein said fluid is water and said a pulsating drip lateral is pulsating drip irrigation lateral.

* * * * *